US010269263B2

(12) United States Patent
Carrick

(10) Patent No.: US 10,269,263 B2
(45) Date of Patent: Apr. 23, 2019

(54) MUSIC MUSCLES—FINGER EXERCISE DEVICE TO BE USED WHILE PRACTICING ANY MUSICAL INSTRUMENT THAT REQUIRES THE USE OF THE FINGERS OR ANY OTHER ACTIVITY THAT REQUIRES THE USE OF THE FINGERS SUCH AS TYPING, SPORTS THAT REQUIRE THE USE OF THE HANDS, OR HAND, WRIST AND FINGER REHABILITATION

(71) Applicant: Robert Todd Carrick, Irwin, PA (US)

(72) Inventor: Robert Todd Carrick, Irwin, PA (US)

( * ) Notice: Subject to any disclaimer, the term of this patent is extended or adjusted under 35 U.S.C. 154(b) by 29 days.

(21) Appl. No.: 15/603,447

(22) Filed: May 24, 2017

(65) Prior Publication Data

US 2018/0240354 A1  Aug. 23, 2018

Related U.S. Application Data

(60) Provisional application No. 62/462,304, filed on Feb. 22, 2017.

(51) Int. Cl.
| | |
|---|---|
| *G09B 15/06* | (2006.01) |
| *A63B 21/04* | (2006.01) |
| *A63B 23/16* | (2006.01) |
| *A63B 23/14* | (2006.01) |
| *A63B 69/00* | (2006.01) |

(Continued)

(52) U.S. Cl.
CPC .............. *G09B 15/06* (2013.01); *A63B 21/04* (2013.01); *A63B 21/0552* (2013.01); *A63B 21/4019* (2015.10); *A63B 23/14* (2013.01); *A63B 23/16* (2013.01); *A63B 69/0002* (2013.01); *A63B 69/0024* (2013.01); *A63B 69/0071* (2013.01)

(58) Field of Classification Search
CPC . G09B 15/06; A63B 69/0024; A63B 69/0071; A63B 69/0002; A63B 21/04; A63B 23/16; A63B 21/4019; A63B 21/0552; A63B 23/14
See application file for complete search history.

(56) References Cited

U.S. PATENT DOCUMENTS 3,782,719 A  *  1/1974  Kuhlman ............... A63B 23/16
                                                          482/48
6,179,751 B1 *  1/2001  Clears ................ A63B 21/0004
                                                          482/44

(Continued)

FOREIGN PATENT DOCUMENTS

WO   WO-2017199081 A1 * 11/2017 ....... A41D 19/01582

*Primary Examiner* — Daniel J Colilla

(57) ABSTRACT

An apparatus for improving finger speed, agility and grip strength for musicians, athletes, and patients requiring finger, hand, wrist or forearm rehabilitation; the apparatus comprises a set of rings in which each ring is placed on the middle phalanx of a finger and the distal phalanx of a thumb; each ring further comprises a groove in the outer center surrounding each ring in which the loops of an elastic tension band, comprised of a series of seamless interconnected closed loops, are inserted into the groove around each ring to complete the apparatus; the apparatus provides positive and negative resistance to the fingers while practicing musical instruments, sports activities, or performing medical rehabilitation therapy, for the purposes of improving finger speed, agility and overall grip strength.

9 Claims, 16 Drawing Sheets

(51) Int. Cl.
     *A63B 21/055*     (2006.01)
     *A63B 21/00*      (2006.01)

(56) References Cited

U.S. PATENT DOCUMENTS

| | | | | |
|---|---|---|---|---|
| 6,986,728 | B2 * | 1/2006 | Kasun | A63B 21/0004 |
| | | | | 482/44 |
| 8,968,158 | B2 * | 3/2015 | Poli | A63B 21/023 |
| | | | | 482/46 |
| 2006/0247102 | A1 * | 11/2006 | Kupferman | A63B 21/0004 |
| | | | | 482/44 |
| 2010/0311546 | A1 * | 12/2010 | Kupferman | A63B 21/0004 |
| | | | | 482/47 |
| 2013/0333097 | A1 * | 12/2013 | Cranke | A63B 21/0557 |
| | | | | 2/300 |
| 2014/0128225 | A1 * | 5/2014 | Weck | A63B 71/14 |
| | | | | 482/44 |
| 2018/0214742 | A1 * | 8/2018 | Harrison | A63B 23/16 |

\* cited by examiner

MUSIC MUSCLES—FINGER EXERCISE DEVICE TO BE USED WHILE PRACTICING ANY MUSICAL INSTRUMENT THAT REQUIRES THE USE OF THE FINGERS OR ANY OTHER ACTIVITY THAT REQUIRES THE USE OF THE FINGERS SUCH AS TYPING, SPORTS THAT REQUIRE THE USE OF THE HANDS, OR HAND, WRIST AND FINGER REHABILITATION

CROSS REFERENCE TO RELATED APPLICATIONS

Provisional Patent Application No. 62/462,304 Filing or 371(c) Date Feb. 22, 2017

BACKGROUND OF THE INVENTION

Field of the Invention

The invention relates to devices for exercising the hands, forearms, wrists and fingers while practicing a specific activity using your fingers.

Various finger exercise devices are available on the market today, but none exist that are effectively utilized while practicing a musical instrument that requires the use of the fingers or any other activity that requires the use of the fingers such as typing, sports that utilize the hands and general rehabilitation for the hands, wrists, forearms or fingers. Furthermore, most are complex and are simply not designed to be utilized while performing or practicing the specific activity using your fingers.

While current products may increase finger strength, the pattern of exercising does not exactly match the nature of finger movement while playing the musical instrument, typing, or other activity utilizing the fingers limiting the development of increased muscle, tendon and ligament strength, speed, accuracy and agility by only allowing the movement of fingers to the path allowed by the device. In addition, most devices on the market today involve some type of elastic wrapped around the hands, wrist or fingers restricting blood flow and providing discomfort to the fingers.

In this Utility Patent, "Instrument" refers to any device that is used while exercising the fingers with the apparatus such as the guitar, piano, trumpet, banjo, violin, saxophone, flute, computer keyboard, typewriter, football, baseball, basketball, etc.

BRIEF SUMMARY OF THE INVENTION

This device is a collection of firm, yet slightly flexible, varying sized Rings that will be placed on each finger used during the activity of exercising the instrument with a "Rubber Band" like tension device comprised of a series of seamless interconnected loops placed over each Ring to provide resistance to the fingers for the purposes of exercising the fingers, hand, wrist and forearm while practicing the Instrument, sports or rehabilitation activity and placed between the distal interphalangeal Joint and the proximal interphalangeal joint on the fingers and on the distal phalanx of the thumb. Each Ring will contain a slotted groove in the center and around the entire circumference to securely hold the "Rubber Band" like tension device in place while practicing the instrument, sports or rehabilitation activity.

DETAILED DESCRIPTION OF INVENTION

Figure 1:
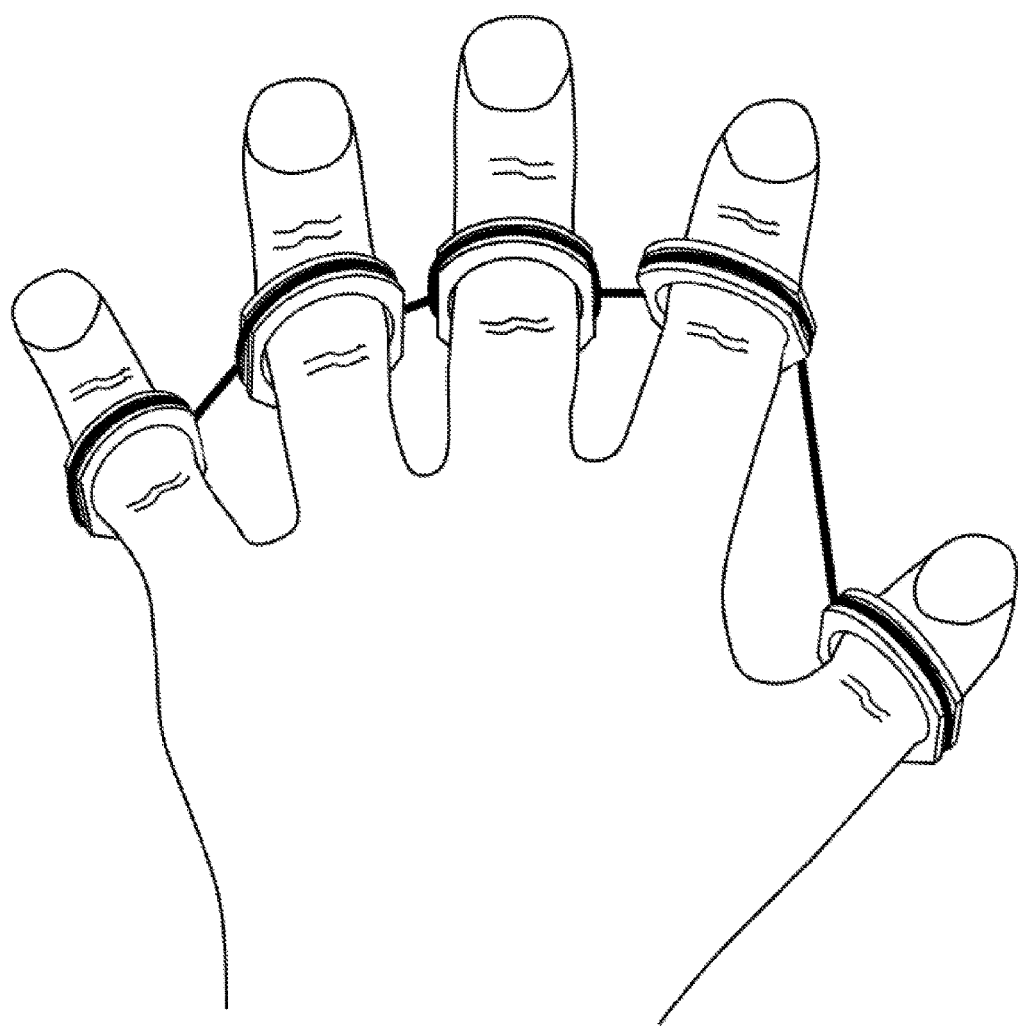
FIG. 1, FIG. 2, FIG. 3 shows the fully assembled device for Five, Four and Three Finger Instruments respectively installed on the fingers in the proper location.
Figure 2:
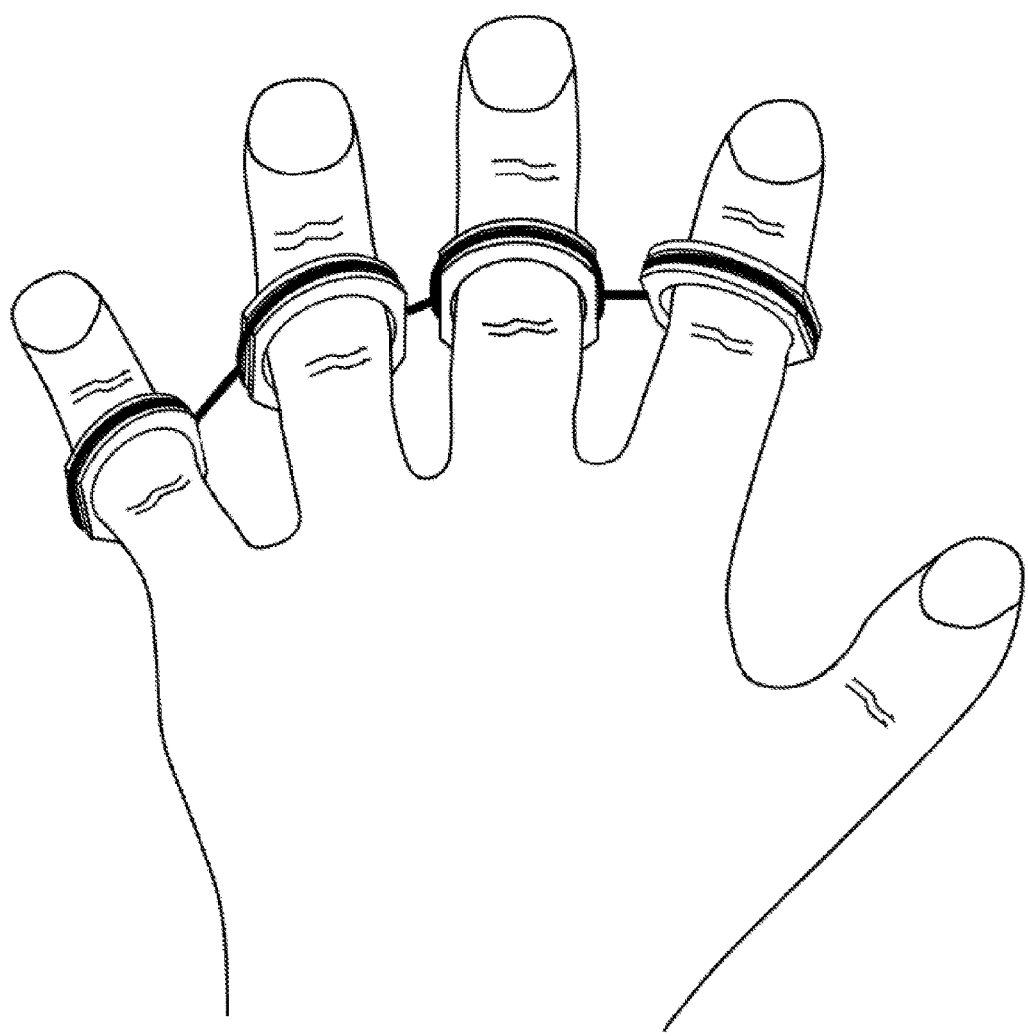
Figure 3:
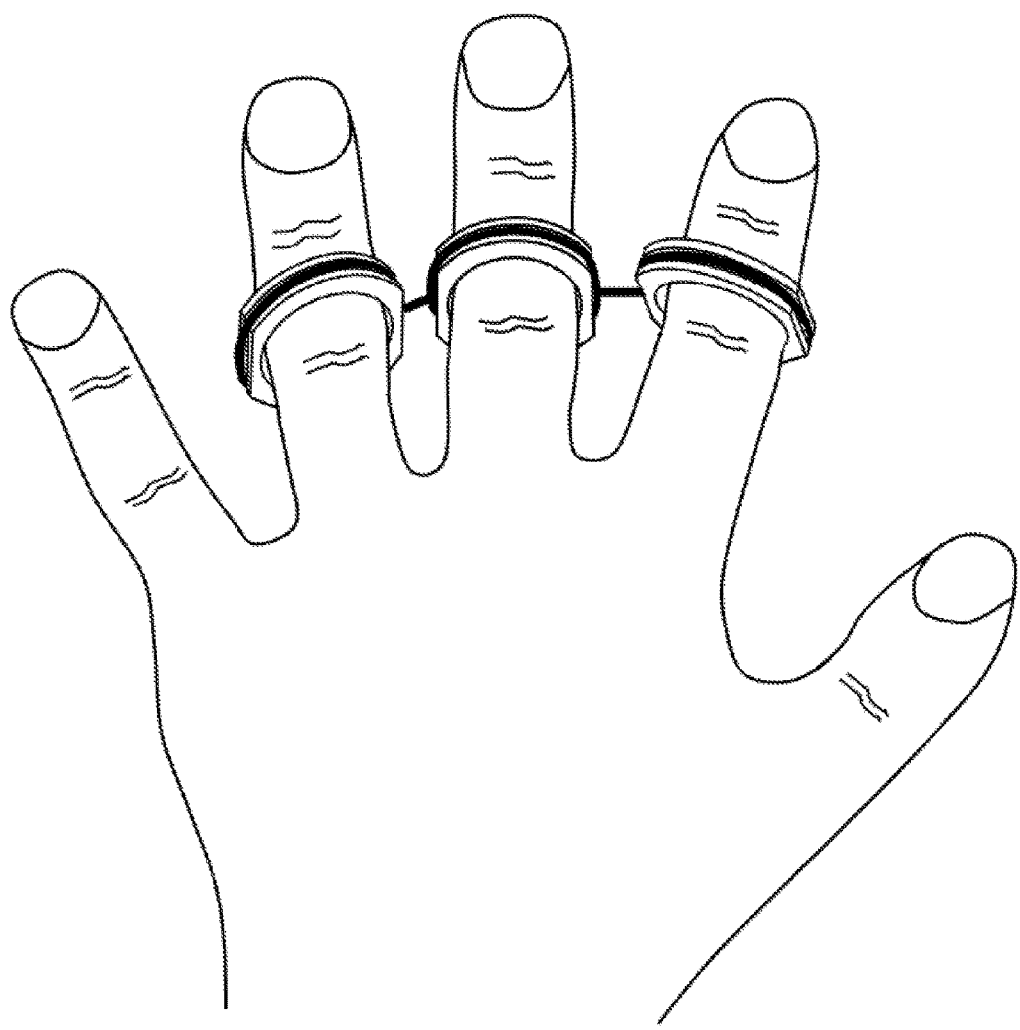

The present invention is a collection of collection of firm, yet slightly flexible rings that will be sized and placed on each finger. Next, a "Rubber Band" like tension device comprised of a series of seamless interconnected closed loops will be placed over each Ring to provide positive and negative resistance to the fingers for the purposes of exercising the fingers, hand, wrist and forearm while practicing the Instrument, sports or rehabilitation activity. It is important to note that each Ring is designed and intended to be placed on the middle phalanx of a finger and the distal phalanx of a thumb. Each Ring will contain a slotted groove in the center and around the entire circumference to securely hold the "Rubber Band" like tension device in place during the practicing session. The device applies to Five, Four and Three Finger Instruments, as well as various sports activities and rehabilitation therapy. FIG. 1, FIG. 2 AND FIG. 3 shows the fully assembled device for Five, Four and Three Finger Instruments respectively installed on the fingers in the proper location. Once a Ring is properly installed on each finger and the interconnected seamless "Rubber Band" like tension device is inserted around each Ring, the user can begin practicing the Instrument or perform any activity such as sports or rehabilitation for the purposes of exercising hand, forearm, wrist or finger activities. The device will put tension on each finger utilized during the practice activity for the purposes of increasing finger strength, speed, agility and accuracy. Because the device is worn during the practice session, each finger will be exercised in a manner which actually mimics the movement of muscles, tendons and ligaments during the actual playing of the Instrument. The product will consist of multiple Rings with varying Diameters to adequately fit each Finger utilized. Multiple "Rubber Band" like tension devices will be included with varying levels of elasticity to give the user the ability to gradually increase resistance as they improve at their Instrument.

Figure 4:
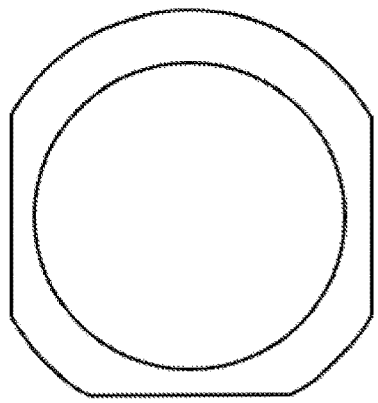
FIG. 4 shows the Front view of the Ring.
Figure 5:
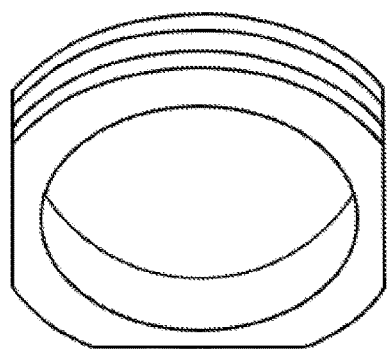
FIG. 5, FIG. 6, FIG. 7, FIG. 8, show orthogonal views of the Ring from the Top, Sides and Bottom perspective respectively.
Figure 6:
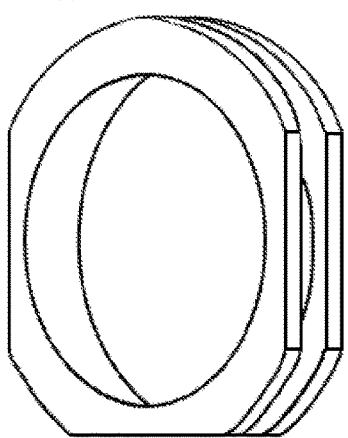
Figure 7:
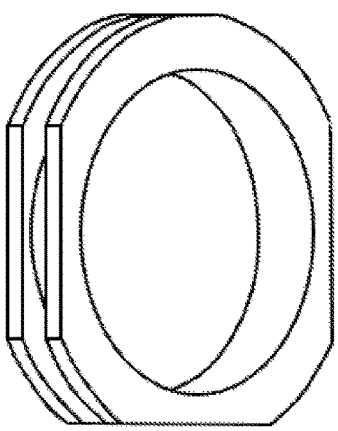
Figure 8:
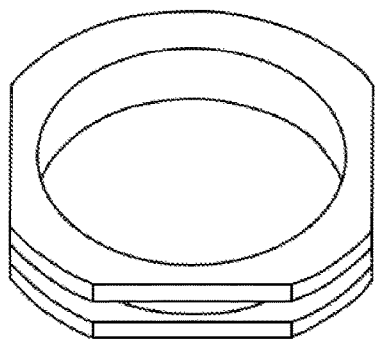
Figure 9:
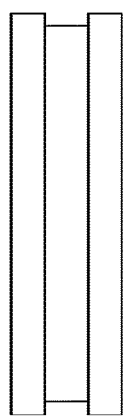
FIG. 9, FIG. 10, FIG. 11, FIG. 12, show side views of the Ring from the Top, Sides and Bottom perspective respectively.
Figure 10:
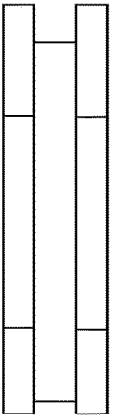
Figure 11:
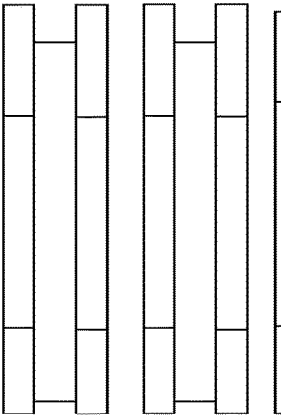
Figure 12:
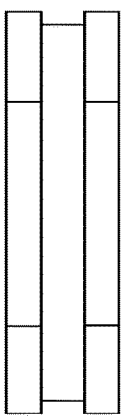

FIG. 4 shows the Front view of the Ring. The illustration references multiple Ring Sizes with varying diameters to fit all common Finger Sizes. The sides of the rings will have parallel cut on each side to allow rings to move more freely between fingers when exercising the instrument so as not to interfere with the practicing session. The bottom of the Ring will also have a cut out/slice so as not to interfere with the actual Instrument that is being used. The ring is intended to be inserted on the finger with the Rounded/non-sliced top portion on the top side of the hand with the bottom/sliced side on the Palm side of the hand.

FIG. 5, FIG. 6, FIG. 7, FIG. 8 show orthogonal views of the Ring from the Top, Sides and Bottom perspective respectively. Each Ring will contain a slotted groove in the center and around the entire circumference of the Ring to securely hold the "Rubber Band" like tension device in place. The Rings will be made of a firm, yet slightly flexible material to allow the Ring to slightly bend in the direction that the "Rubber Band" like tension device moves as the user is practicing with the device allowing the tension device to stay securely in place.

FIG. 9, FIG. 10, FIG. 11, FIG. 12 show side views of the Ring from the Top, Sides and Bottom perspective respectively.

Figure 13:
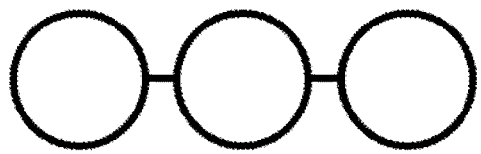
FIG. 13 and FIG. 14 show front and orthogonal views respectively of the "Rubber Band" like tension device that will be used for 3 finger Instruments that will be inserted into the grooves of the Rings.
Figure 14:
Figure 15:
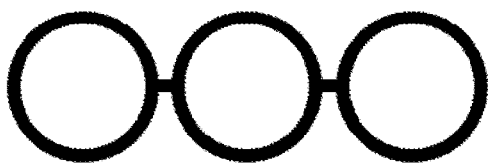
FIG. 15 and FIG. 16 show the same as FIG. 13 and FIG. 14 but are slightly thicker to provide more tension than FIG. 13 and FIG. 14.
Figure 16:
Figure 17:
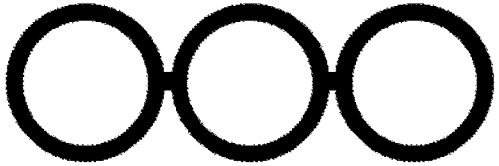
FIG. 17 and FIG. 18 show the same as FIG. 15 and FIG. 16 but are slightly thicker to provide more tension than FIG. 15 and FIG. 16.
Figure 18:
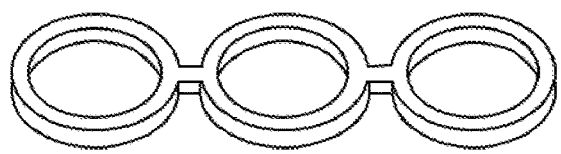

FIG. 13 and FIG. 14 show front and orthogonal views respectively of the "Rubber Band" like tension device that will be used for 3 finger Instruments that will be inserted into the grooves of the Rings. FIG. 15 and FIG. 16 show the same as FIG. 13 and FIG. 14 but are slightly thicker to provide more tension than FIG. 13 and FIG. 14. FIG. 17 and FIG. 18 show the same as FIG. 15 and FIG. 16 but are slightly thicker to provide more tension than FIG. 15 and FIG. 16.

Figure 19:
FIG. 19 and FIG. 20 show front and orthogonal views respectively of the "Rubber Band" like tension device that will be used for 4 finger Instruments that will be inserted into the grooves of the Rings.
Figure 20:
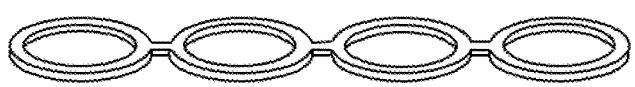
Figure 21:
FIG. 21 and FIG. 22 show the same as FIG. 19 and FIG. 20 but are slightly thicker to provide more tension than FIG. 19 and FIG. 20.
Figure 22:
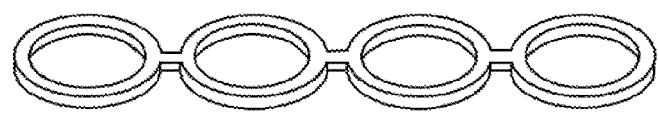
Figure 23:
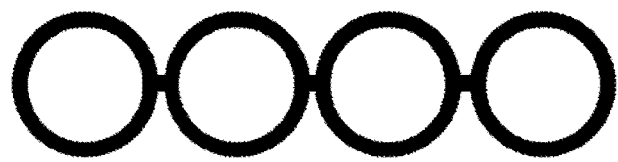
FIG. 23 and FIG. 24 show the same as FIG. 21 and FIG. 22 but are slightly thicker to provide more tension than FIG. 21 and FIG. 22.
Figure 24:
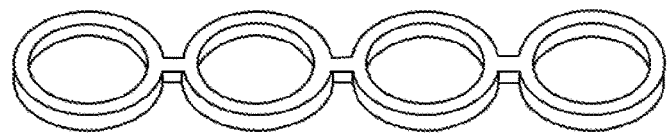

FIG. 19 and FIG. 20 show front and orthogonal views respectively of the "Rubber Band" like tension device that will be used for 4 finger Instruments that will be inserted into the grooves of the Rings. FIG. 21 and FIG. 22 show the same as FIG. 19 and FIG. 20 but are slightly thicker to provide more tension than FIG. 19 and FIG. 20. FIG. 23 and FIG. 24 show the same as FIG. 21 and FIG. 22 but are slightly thicker to provide more tension than FIG. 21 and FIG. 22.

Figure 25:
FIG. 25 and FIG. 26 show front and orthogonal views respectively of the "Rubber Band" like tension device that will be used for 5 finger Instruments that will be inserted into the grooves of the Rings.
Figure 26:
Figure 27:
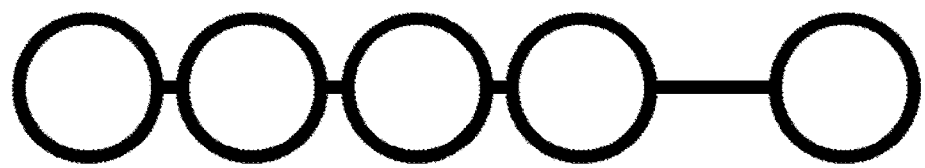
FIG. 27 and FIG. 28 show the same as FIG. 25 and FIG. 26 but are slightly thicker to provide more tension than FIG. 25 and FIG. 26.
Figure 28:
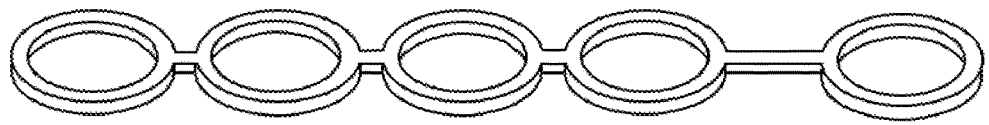
Figure 29:
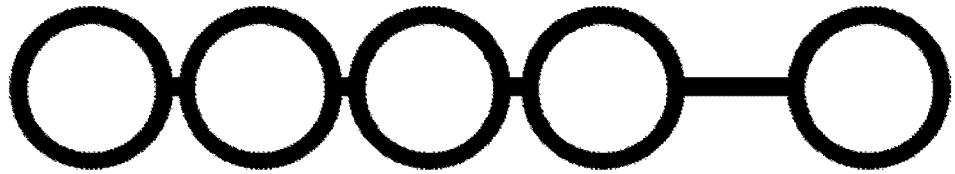
FIG. 29 and FIG. 30 show the same as FIG. 27 and FIG. 28 but are slightly thicker to provide more tension than FIG. 27 and FIG. 28.
Figure 30:
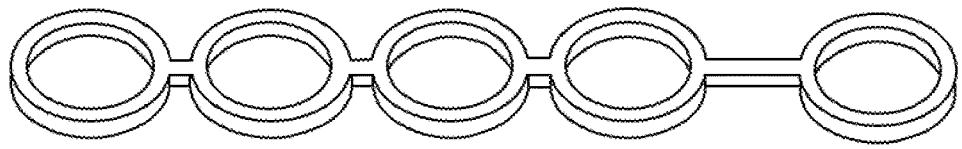

FIG. 25 and FIG. 26 show front and orthogonal views respectively of the "Rubber Band" like tension device that will be used for 5 finger Instruments that will be inserted into the grooves of the Rings. FIG. 27 and FIG. 28 show the same as FIG. 25 and FIG. 26 but are slightly thicker to provide more tension than FIG. 25 and FIG. 26. FIG. 29 and FIG. 30 show the same as FIG. 27 and FIG. 28 but are slightly thicker to provide more tension than FIG. 27 and FIG. 28.

Figure 31A:
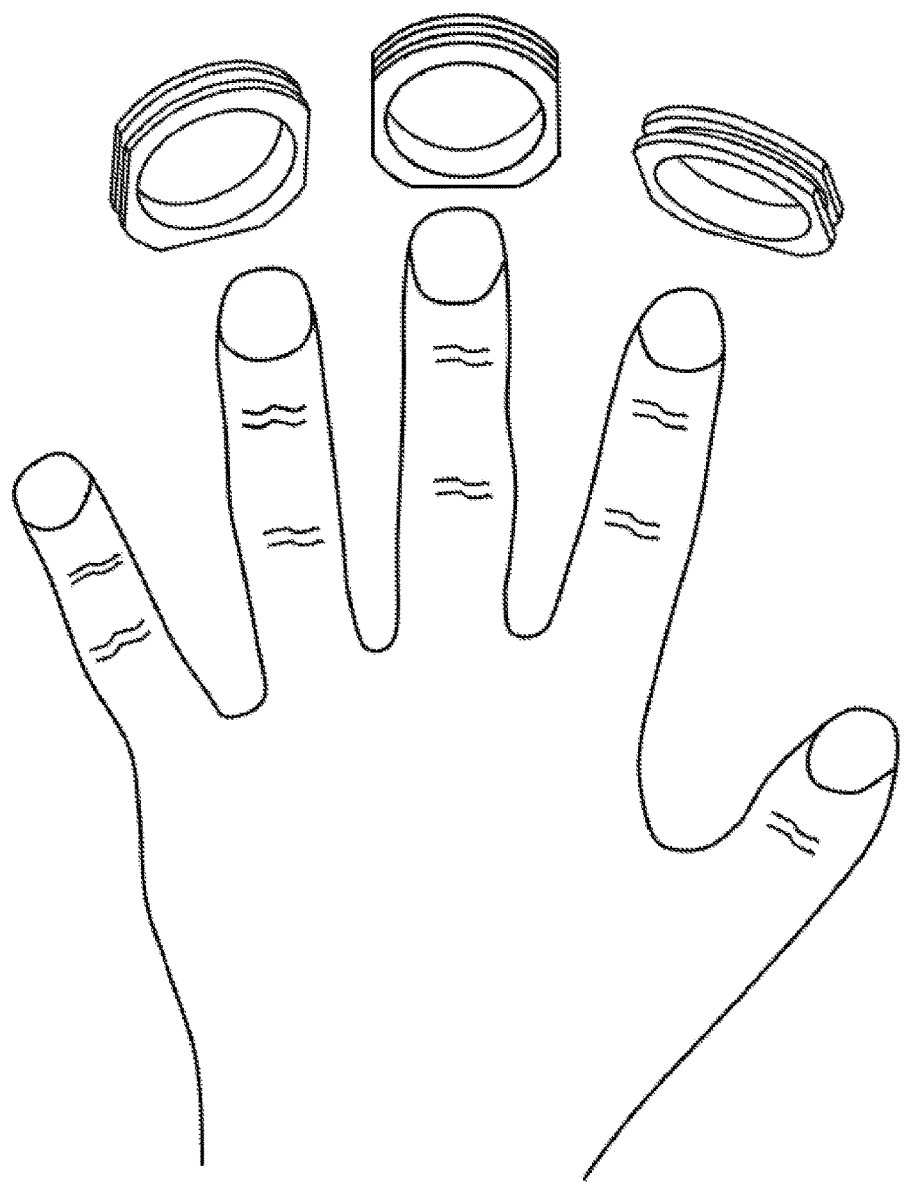
FIG. 31A shows the Rings positioned prior to the fingers being inserted for 3 finger instruments.
Figure 31B:
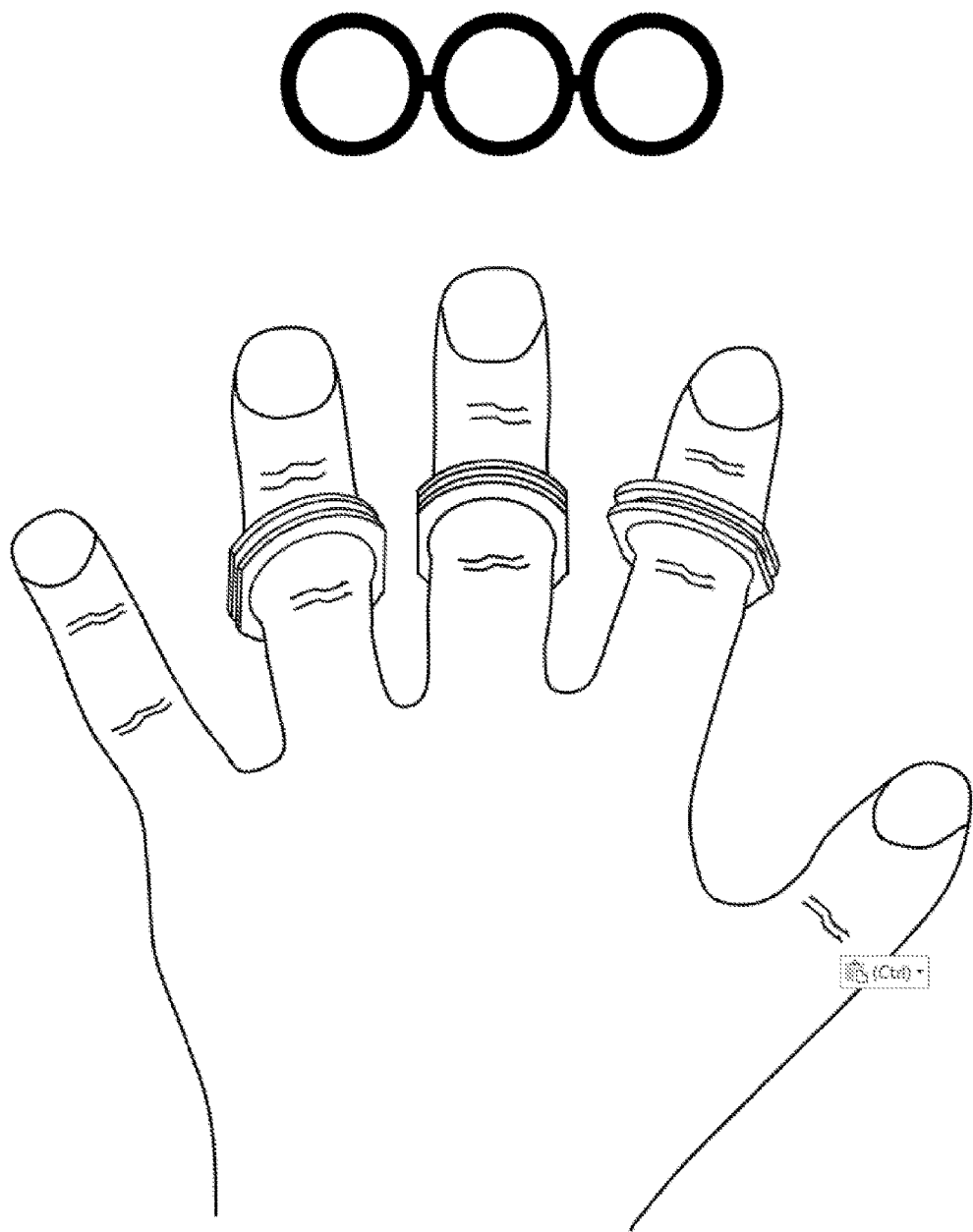
FIG. 31B shows the "Rubber Band" like Tension band prior to being inserted into the grooves of the rings as well as the Rings properly positioned on the fingers.
Figure 31C:
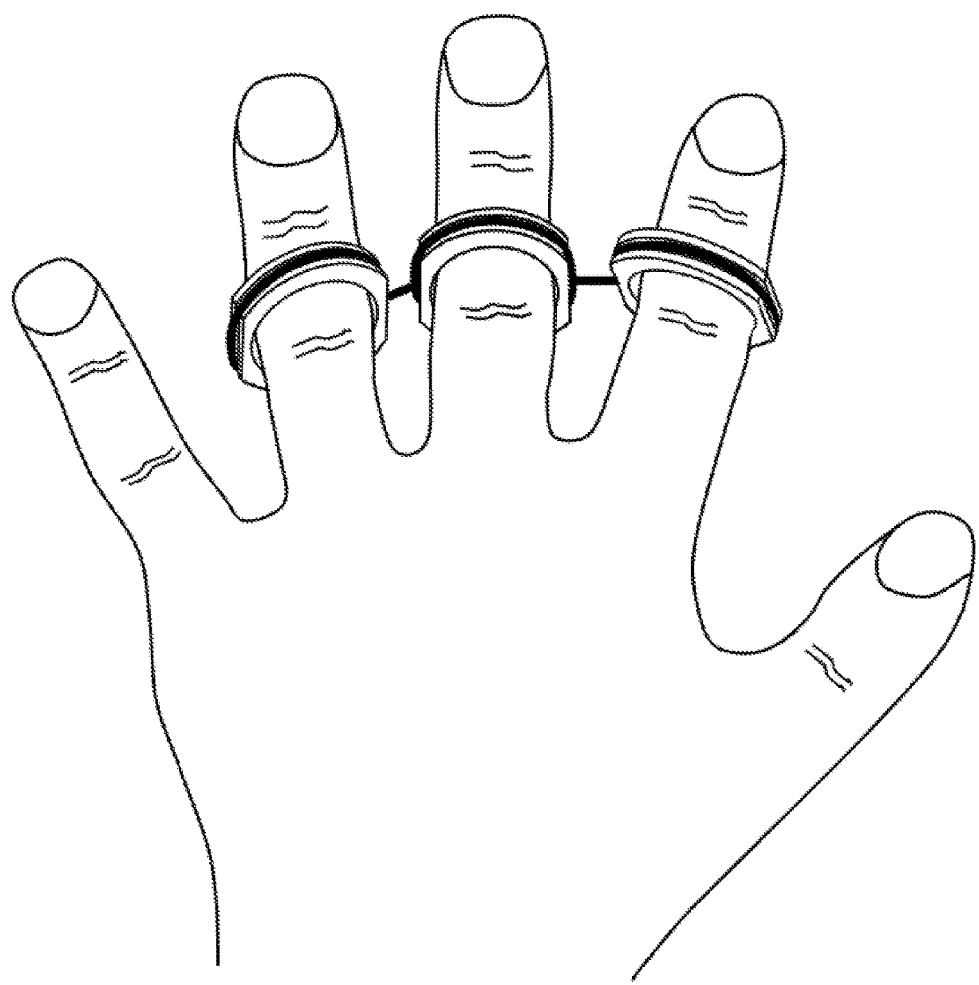
FIG. 31C shows the fully assembled device for 3 finger instruments with both the Rings and the "Rubber Like" Tension band properly positioned.

FIG. 31A shows the Rings positioned prior to the fingers being inserted for 3 finger instruments. FIG. 31B shows the "Rubber Band" like Tension band prior to being inserted into the grooves of the rings as well as the Rings properly positioned on the fingers. FIG. 31C shows the fully assembled device for 3 finger instruments with both the Rings and the "Rubber Like" Tension band properly positioned.

Figure 32A:
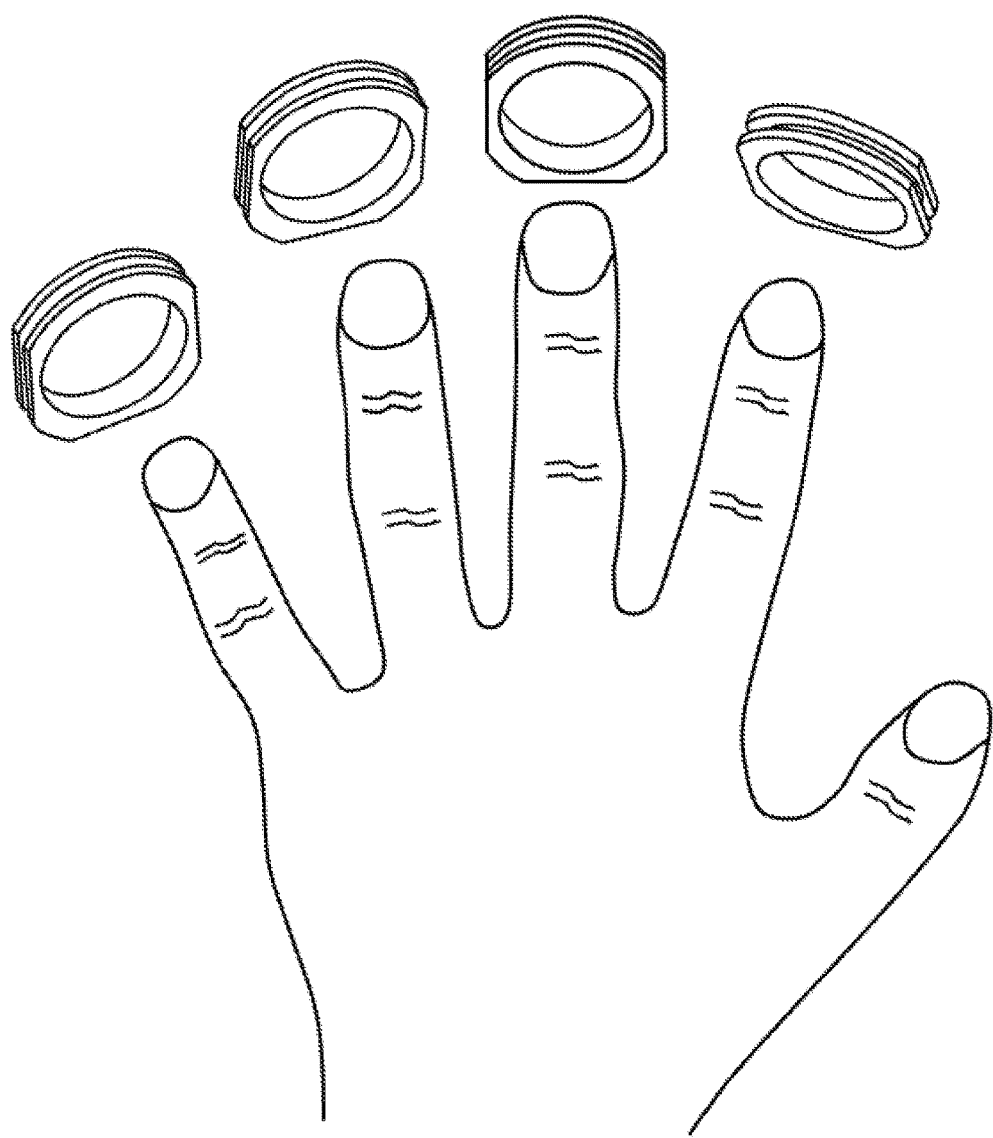
FIG. 32A shows the Rings positioned prior to the fingers being inserted for 4 finger instruments.
Figure 32B:
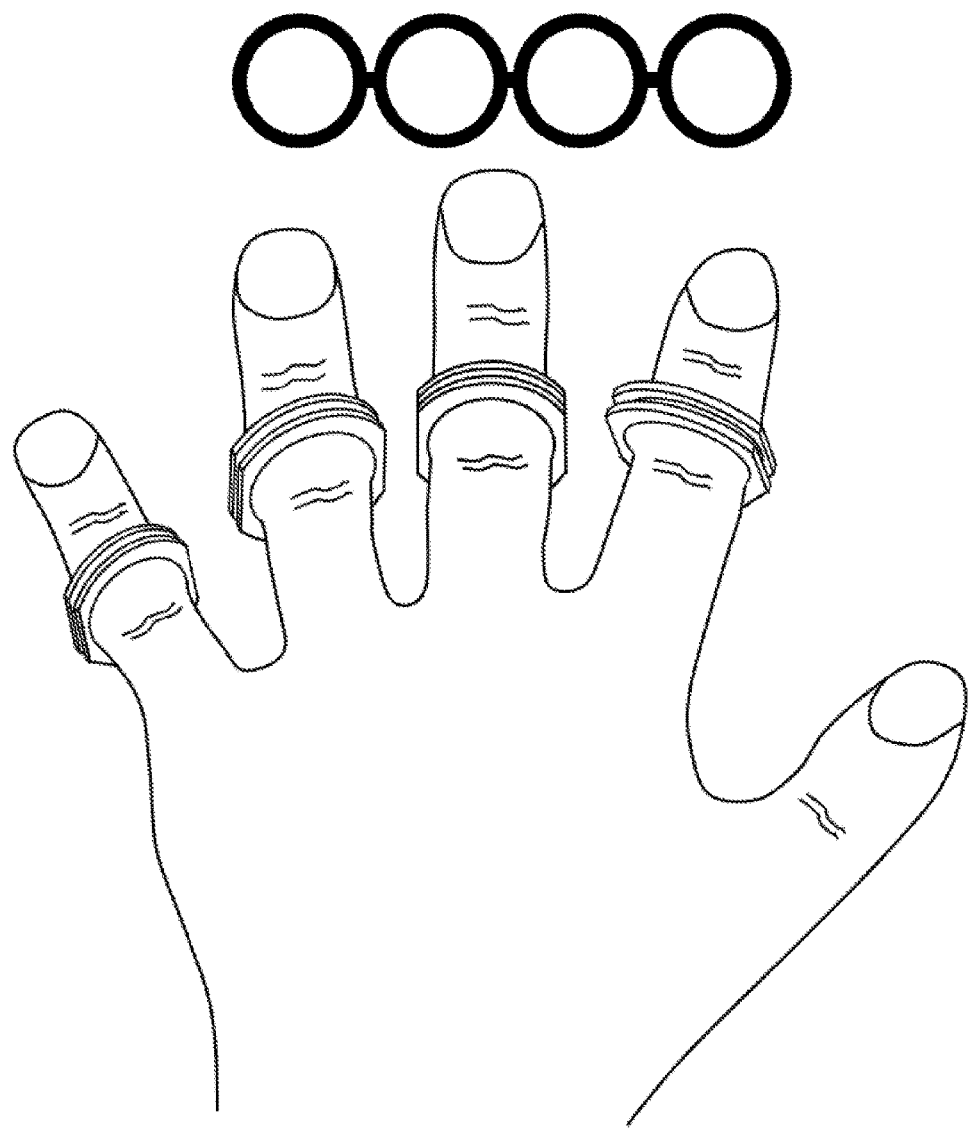
FIG. 32B shows the "Rubber Band" like Tension band prior to being inserted into the grooves of the rings as well as the Rings properly positioned on the fingers.
Figure 32C:
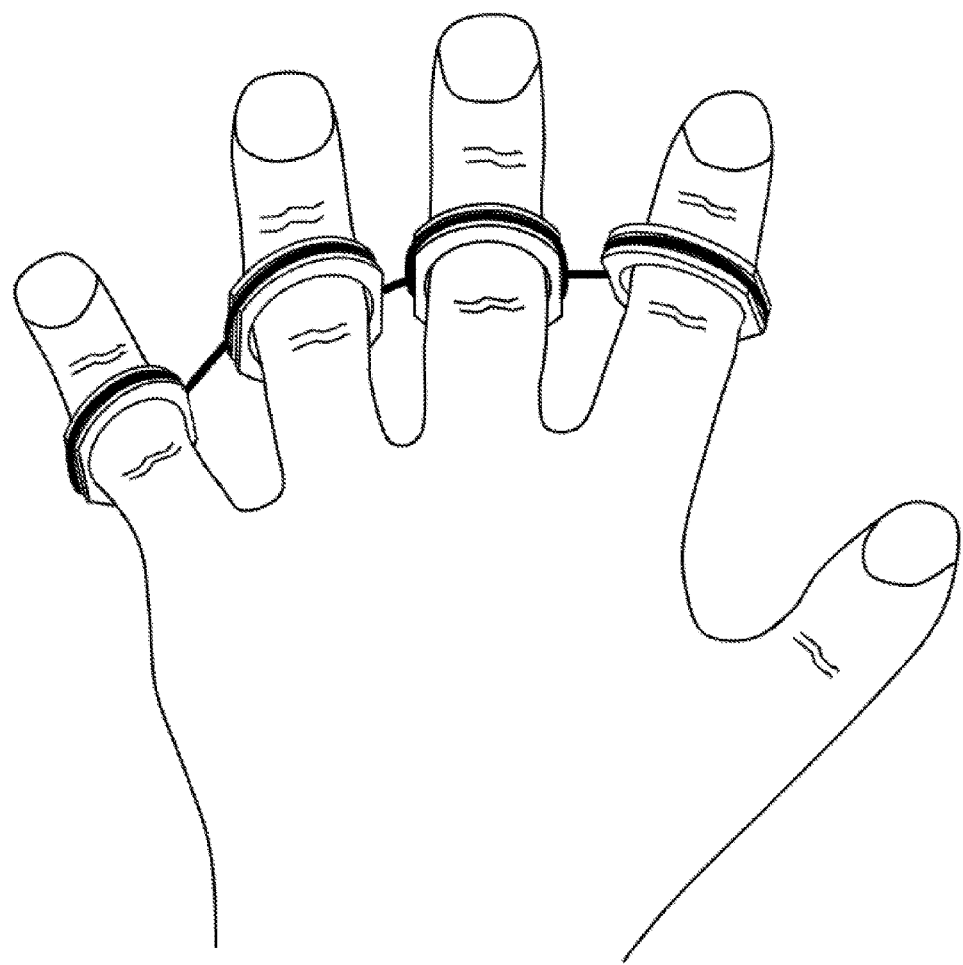
FIG. 32C shows the fully assembled device for 4 finger instruments with both the Rings and the "Rubber Like" Tension band properly positioned.

FIG. 32A shows the Rings positioned prior to the fingers being inserted for 4 finger instruments. FIG. 32B shows the "Rubber Band" like Tension band prior to being inserted into the grooves of the rings as well as the Rings properly positioned on the fingers. FIG. 32C shows the fully assembled device for 4 finger instruments with both the Rings and the "Rubber Like" Tension band properly positioned.

Figure 33A:
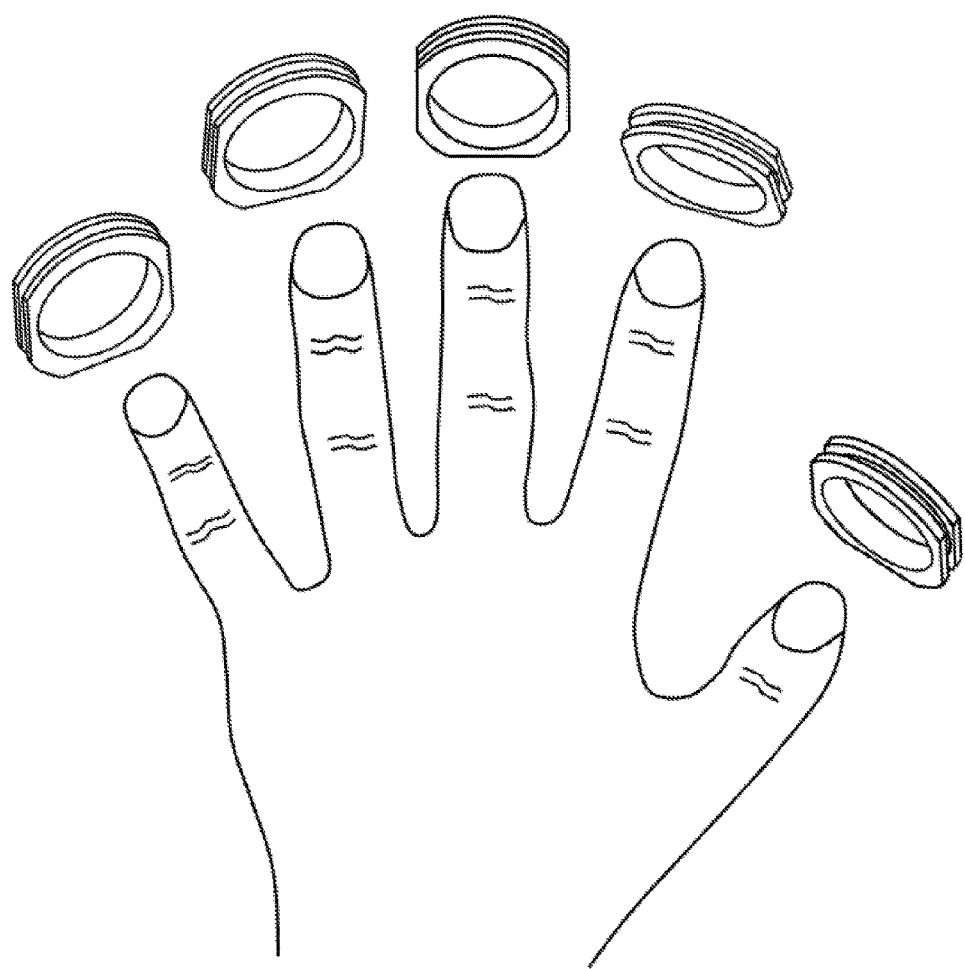
FIG. 33A shows the Rings positioned prior to the fingers being inserted for 5 finger instruments.
Figure 33B:
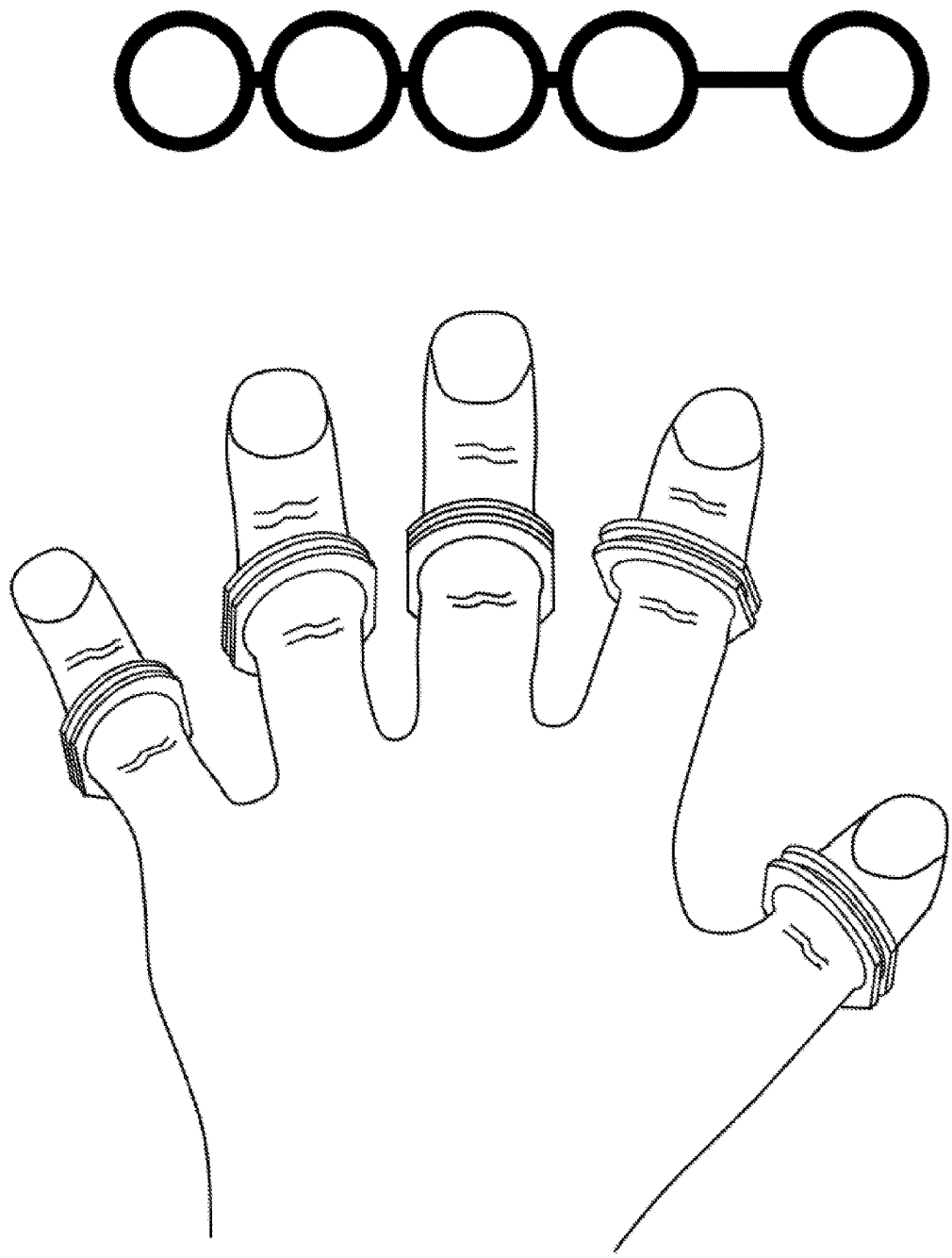
FIG. 33B shows the "Rubber Band" like Tension band prior to being inserted into the grooves of the rings as well as the Rings properly positioned on the fingers.
Figure 33C:
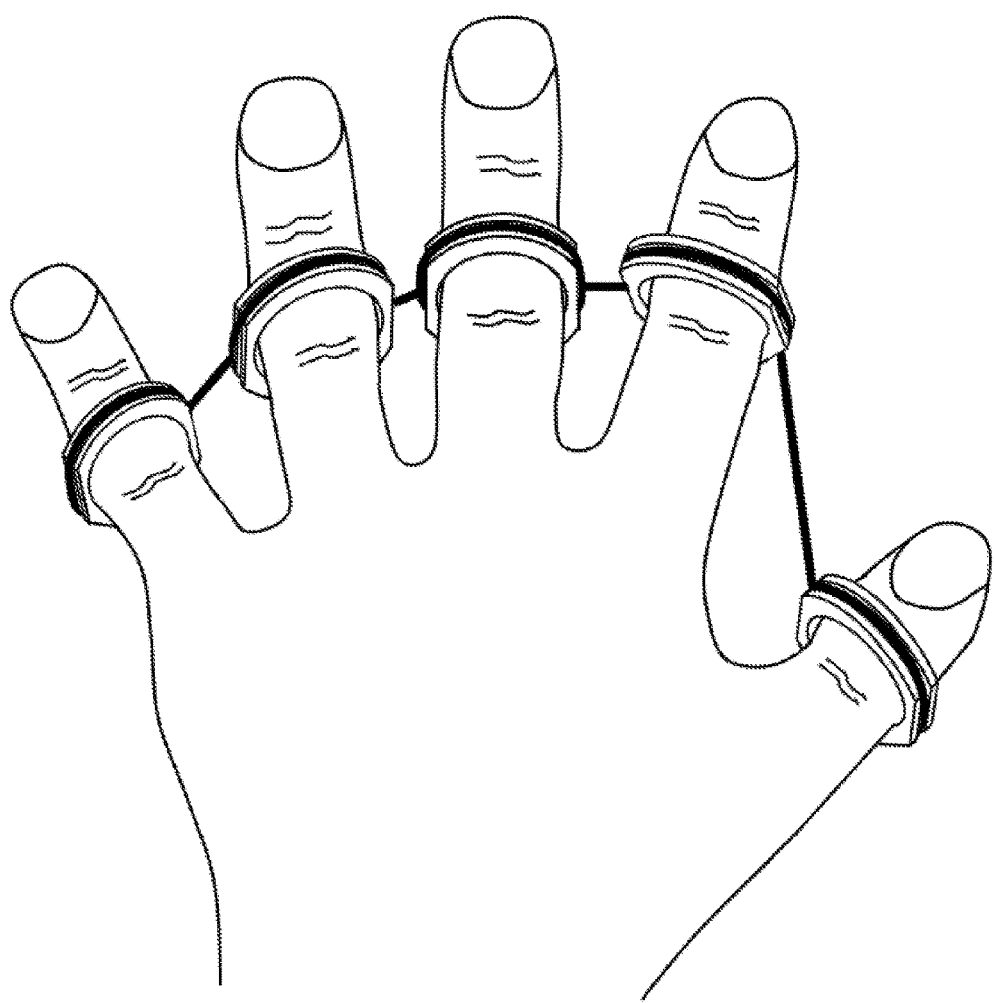
FIG. 33C shows the fully assembled device for 5 finger instruments with both the Rings and the "Rubber Like" Tension band properly positioned

FIG. 33A shows the Rings positioned prior to the fingers being inserted for 5 finger instruments. FIG. 33B shows the "Rubber Band" like Tension band prior to being inserted into the grooves of the rings as well as the Rings properly positioned on the fingers. FIG. 33C shows the fully assembled device for 5 finger instruments with both the Rings and the "Rubber Like" Tension band properly positioned.

The invention claimed is:

1. An apparatus for finger exercise, comprising:
    a collection of firm, slightly flexible, varying sized rings, each of which is designed to be associated with a middle phalanx of a finger and a distal phalanx of a thumb;
    a groove, in an outer center surface surrounding each said ring; and
    a rubber band like tension device, consisting of a series of seamless interconnected elastic closed loops, in which the closed loops are wrapped around each said ring and inserted into the said groove of each ring, connecting the rings together to form the said apparatus.

2. The apparatus, according to claim 1, wherein said rings further comprise:
    parallel cut outs or slices on a side of each ring to allow fingers or a thumb of a hand to move more freely and not interfere with each other while exercising using said apparatus; and
    a cut out or slice on the bottom or each ring to further minimize interference while exercising using said apparatus,
    wherein said rings are intended to be inserted on the fingers or thumb with a rounded or non-sliced top portion on the top side of the hand with the bottom sliced side on a palm side of the hand, wherein said rings will not inhibit blood flow or circulation when placed on the fingers or thumb as what occurs with other elastic only finger exercise devices.

3. The apparatus, according to claim 1 or 2, wherein said apparatus is used for the purposes of increasing finger, hand and forearm, strength, speed, agility, endurance, and overall grip strength, while practicing any musical instrument requiring the use of the fingers and thumb with special regards to guitar, piano, bass, trumpet, banjo, saxophone, flute, piccolo; while practicing any sports activity with special regards to football, baseball, basketball and hockey; while performing any rehabilitation therapy activity with special regards to injuries to the hand, wrist, forearm, shoulder or fingers and thumb; and while performing general activities and exercises requiring the use of the hands and fingers and thumb; said apparatus comprising said rubber band like tension device with three to five seamless interconnected elastic closed loops and from three to five said rings placed on any consecutive digits between the distal interphalangeal joint and the proximal interphalangeal joint on the fingers and on the distal phalanx of the thumb, depending on the desired musical instrument, sports activity, rehabilitation therapy or general exercise activity.

4. The apparatus according to claim 1 or 2 wherein the size of said varying sized rings in the apparatus, once properly sized to each finger or thumb, can remain constant while the practitioner can use varying amounts of resistance using multiple thicknesses of said rubber band like tension device, while utilizing the said apparatus.

5. The apparatus according to claim 1 or 2, wherein said apparatus provides positive and negative resistance in any and all directions that the fingers or thumb travel when utilizing said apparatus, allowing each finger or thumb to be exercised in a similar manner which mimics the movement of muscles, tendons and ligaments, during the exercise or practicing activity, as what would occur without using said apparatus.

6. The apparatus according to claim 3, wherein the size of said varying sized rings in the apparatus, once properly sized to each finger or thumb, can remain constant while the practitioner can use varying amounts of resistance using multiple thicknesses of said rubber band like tension device, while utilizing the said apparatus.

7. The apparatus according to claim 6 wherein said apparatus provides positive and negative resistance in any and all directions that the fingers or thumb travel when utilizing said apparatus, allowing each finger or thumb to be exercised in a similar manner which mimics the movement of muscles, tendons and ligaments, during the exercise or practicing activity, as what would occur without using said apparatus.

8. An apparatus for finger exercise, comprising:
a collection of firm, slightly flexible, varying sized rings, each of which is designed to be associated with a middle phalanx of a finger and a distal phalanx of a thumb;
a groove, in an outer center surface surrounding each said ring;
a rubber band like tension device, consisting of a series of seamless interconnected elastic closed loops, in which the closed loops are wrapped around each said ring and inserted into the said groove of each ring, connecting the rings together to form the said apparatus, wherein the size of said varying sized rings in the apparatus, once properly sized to each finger or thumb, can remain constant while the practitioner can use varying amounts of resistance using multiple thicknesses of said rubber band like tension device, while utilizing the said apparatus, and wherein said apparatus provides positive and negative resistance in any and all directions that the fingers or thumb travel when utilizing said apparatus, allowing each finger or thumb to be exercised in a similar manner which mimics the movement of muscles, tendons and ligaments, during the exercise or practicing activity, as what would occur without using said apparatus.

9. An apparatus for finger exercise, comprising:
a collection of firm, slightly flexible, varying sized rings, each of which is designed to be associated with a middle phalanx of a finger and a distal phalanx of a thumb;
a groove, in an outer center surface surrounding each said ring;
a rubber band like tension device, consisting of a series of seamless interconnected elastic closed loops, in which the closed loops are wrapped around each said ring and inserted into the said groove of each ring, connecting the rings together to form the said apparatus, wherein said apparatus is used for the purposes of increasing finger, hand and forearm, strength, speed, agility, endurance, and overall grip strength, while practicing any musical instrument requiring the use of the fingers and thumb with special regards to guitar, piano, bass, trumpet, banjo, saxophone, flute, piccolo; while practicing any sports activity with special regards to football, baseball, basketball and hockey; while performing any rehabilitation therapy activity with special regards to injuries to the hand, wrist, forearm, shoulder or fingers and thumb; and while performing general activities and exercises requiring the use of the hands and fingers and thumb; said apparatus comprising said rubber band like tension device with three to five seamless interconnected elastic closed loops and from three to five said rings placed on any consecutive digits between the distal interphalangeal joint and the proximal interphalangeal joint on the fingers and on the distal phalanx of the thumb, depending on the desired musical instrument, sports activity, rehabilitation therapy or general exercise activity, wherein the size of said varying sized rings in the apparatus, once properly sized to each finger or thumb, can remain constant while the practitioner can use varying amounts of resistance using multiple thicknesses of said rubber band like tension device, while utilizing the said apparatus, and wherein said apparatus provides positive and negative resistance in any and all directions that the fingers or thumb travel when utilizing said apparatus, allowing each finger or thumb to be exercised in a similar manner which mimics the movement of muscles, tendons and ligaments, during the exercise or practicing activity, as what would occur without using said apparatus.

* * * * *